US012439249B2

(12) United States Patent
Ma

(10) Patent No.: US 12,439,249 B2
(45) Date of Patent: Oct. 7, 2025

(54) METHODS AND APPARATUS RELATING TO AUTHENTICATION OF A WIRELESS DEVICE

(71) Applicant: Telefonaktiebolaget LM Ericsson (publ), Stockholm (SE)

(72) Inventor: Jianxin Ma, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 521 days.

(21) Appl. No.: 17/598,439

(22) PCT Filed: Mar. 29, 2019

(86) PCT No.: PCT/CN2019/080564
§ 371 (c)(1),
(2) Date: Sep. 27, 2021

(87) PCT Pub. No.: WO2020/198991
PCT Pub. Date: Oct. 8, 2020

(65) Prior Publication Data
US 2022/0182822 A1    Jun. 9, 2022

(51) Int. Cl.
*H04W 12/06*    (2021.01)
(52) U.S. Cl.
CPC .................................. *H04W 12/06* (2013.01)
(58) Field of Classification Search
CPC ... H04L 63/08; H04L 9/0861; H04L 63/0869; H04L 63/0876; H04L 63/1466;
(Continued)

(56) References Cited

U.S. PATENT DOCUMENTS 8,555,069 B2    10/2013 Zhu et al.
10,630,682 B1*  4/2020 Bhattacharyya .... H04L 63/0869
(Continued)

FOREIGN PATENT DOCUMENTS

CA    3033619 A1    2/2018
CN    1767429 A     5/2006
(Continued)

OTHER PUBLICATIONS

European Search Report dated Feb. 9, 2022 for Application No. 19922342.1, consisting of 10 pages.
(Continued)

*Primary Examiner* — Mazda Sabouri
(74) *Attorney, Agent, or Firm* — Weisberg I.P. Law, P.A.

(57) ABSTRACT

Methods for operating a wireless device and network entities are disclosed. A method for operating a wireless device includes generating a random value, generating a sequence number, assembling an authentication token from at least the generated sequence number, and sending a message to an entity of the network requesting at least one of registration on the network or service over the network, the message including the generated random value and the authentication token. The methods for operating network entities allow for the authentication of the wireless device using the random value and authentication token. Also disclosed are a wireless device, network entities and a computer program product configured to carry out methods for operating a wireless device and network entities.

7 Claims, 13 Drawing Sheets

(58) Field of Classification Search
CPC .. H04L 9/3242; H04W 60/005; H04W 12/06; H04W 12/069
USPC ........................ 455/411; 379/93.02
See application file for complete search history.

(56) References Cited

U.S. PATENT DOCUMENTS

| | | | | |
|---|---|---|---|---|
| 2003/0200433 A1* | 10/2003 | Stirbu | ................... | H04L 9/0844 713/169 |
| 2009/0024848 A1* | 1/2009 | Takasugi | ............... | H04L 9/3273 713/169 |
| 2009/0240944 A1* | 9/2009 | Cho | ...................... | H04L 9/0891 713/175 |
| 2010/0011220 A1 | 1/2010 | Zhao et al. | | |
| 2011/0252239 A1* | 10/2011 | Lai | ........................ | H04L 9/0838 713/168 |
| 2013/0305386 A1* | 11/2013 | Zhang | ................... | H04L 63/205 726/27 |
| 2015/0010154 A1* | 1/2015 | Chen | ..................... | H04L 9/0872 380/274 |
| 2016/0142467 A1* | 5/2016 | Ban | ..................... | H04L 65/1045 709/219 |
| 2016/0191408 A1* | 6/2016 | Yajima | ................ | H04L 12/4641 709/225 |
| 2018/0184297 A1 | 6/2018 | Mohamed et al. | | |
| 2019/0068562 A1* | 2/2019 | Iyer | ........................ | H04L 9/0637 |
| 2019/0182654 A1* | 6/2019 | Jerichow | ............... | H04L 9/3213 |

FOREIGN PATENT DOCUMENTS

| | | |
|---|---|---|
| CN | 101272251 A | 9/2008 |
| CN | 101330420 A | 12/2008 |
| CN | 101511084 A | 8/2009 |
| CN | 108616350 A | 10/2018 |
| EP | 3285512 A1 | 2/2018 |
| WO | 2018208228 A2 | 11/2018 |

OTHER PUBLICATIONS

Gu et al. A Green and Secure Authentication for the 4th Generation Mobile Network' Australian Telecommunication Networks and Applications Conference, IEEE, pp. 1-7, Nov. 9, 2011, consisting of 7 pages.
Basin et al. "A Formal Analysis of 5G Authentication" ariv.org, Cornell University Library, Ithaca, NY, Jun. 2018, consisting of 21 pages.
International Search Report and Written Opinion dated Jan. 3, 2020 for International Patent No. PCT/CN2019/080564 filed Mar. 29, 2019, consisting of 10-pages.
3GPP TS 33.102 V15.1.0; 3rd Generation Partnership Project; Technical Specification Group Services and System Aspects; 3G Security; Security architecture (Release 15); Dec. 2018, consisting of 77-pages.
3GPP TS 33.501 V15.3.0; 3rd Generation Partnership Project; Technical Specification Group Services and System Aspects; Security architecture and procedures for 5G system (Release 15); Dec. 2018, consisting of 179-pages.
Chinese Office Action and English Summary dated Aug. 31, 2023 for Application No. 201980094515.3, consisting of 11 pages.
European Communication dated Apr. 17, 2025 for Application No. 19922342.1, consisting of 7 pages.
3GPP TS 33.401 V15.6.0; 3rd Generation Partnership Project; Technical Specification Group Services and System Aspects; 3GPP System Architecture Evolution (SAE); Security architecture (Release 15); Dec. 2018, consisting of 163 pages.

* cited by examiner

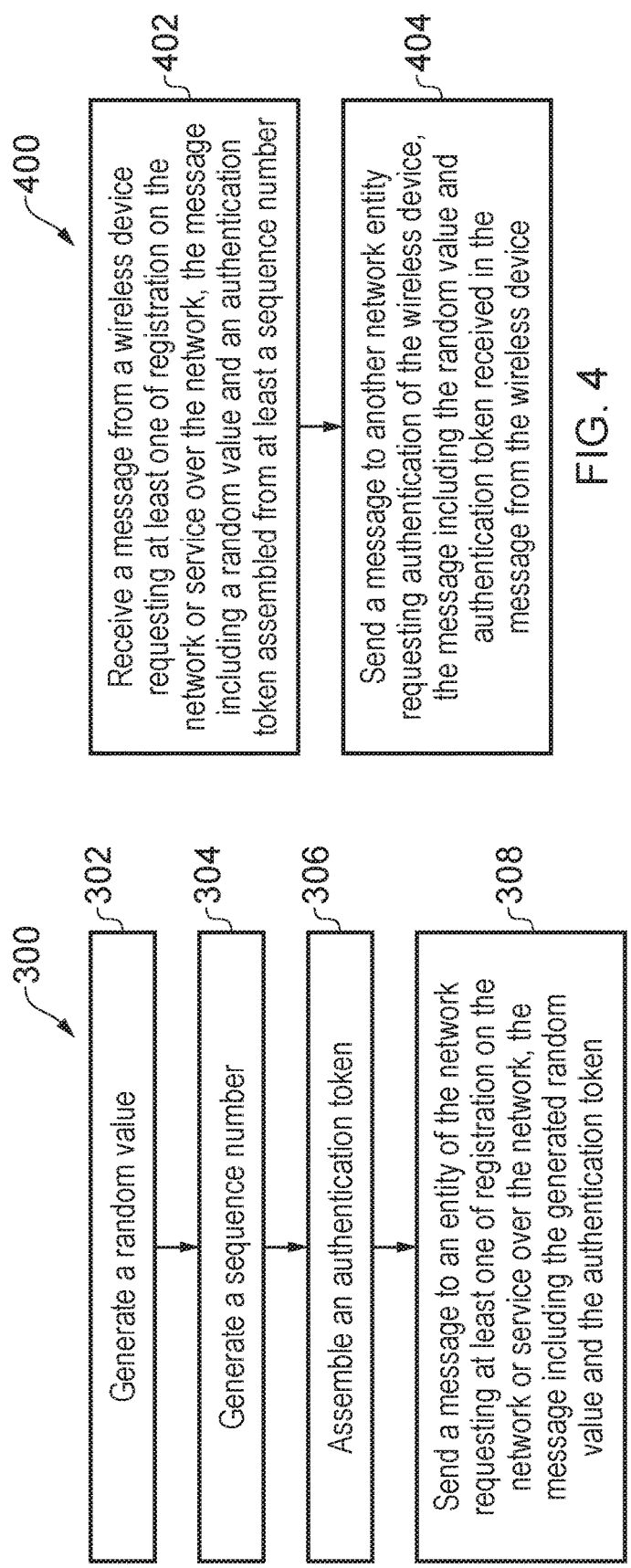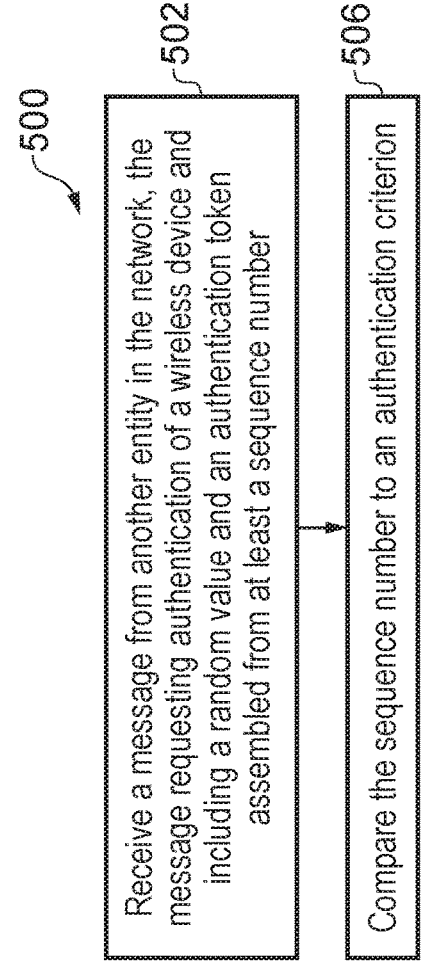

METHODS AND APPARATUS RELATING TO AUTHENTICATION OF A WIRELESS DEVICE

CROSS-REFERENCE TO RELATED APPLICATIONS

This application is a Submission Under 35 U.S.C. § 371 for U.S. National Stage Patent Application of International Application Number: PCT/CN2019/080564, filed Mar. 29, 2019 entitled "METHODS AND APPARATUS RELATING TO AUTHENTICATION OF A WIRELESS DEVICE," the entirety of which is incorporated herein by reference.

TECHNICAL FIELD

The present disclosure relates to methods for operating a wireless device that is operable to connect to a network and for operating entities in a network. The present disclosure also relates to a wireless device, network entities and to a computer program product configured to carry out methods for operating a wireless device and network entities.

BACKGROUND

In a 5G network, the primary Authentication and Key Agreement (AKA) procedures have the following purposes:
1. To enable mutual authentication between the user equipment (UE) and the network;
2. To provide keying material that can be used between the UE and the serving network in subsequent security procedures.

These purposes are set out in 3GPP TS 33.501: Security architecture and procedures for 5G System.

The authentication and key agreement procedures are initiated and controlled by the network. However, there is the possibility for UE to reject the authentication challenge sent by the network. A symmetrical algorithm is applied by the Universal Subscriber Identity Module (USIM) application at the UE side and the appropriate authentication centre in the UE's home network. These entities therefore store the same user confidential data and support the same algorithms to generate an Authentication Vector (AV). A small difference between authentication procedures at the USIM and authentication centre, arising from the initiation of AKA by the network, is that Sequence Number (SQN) and Random (RAND) values are only generated at the home network, and are used by the USIM to authenticate the network.

Existing authentication procedures are illustrated in FIGS. 1 and 2. FIG. 1 is a message sequence diagram illustrating the complete authentication procedure for 5G AKA, including the SQN re-synchronization case. FIG. 2 is a message sequence diagram illustrating the complete authentication procedure for Extensible Authentication Protocol AKA' (EAP-AKA') including the SQN re-synchronization case. It will be appreciated that for the purpose of clarity, the message flows in FIGS. 1 and 2 are simplified to exclude NRF service discovery procedures for the AUSF and UDM.

As can be seen from FIGS. 1 and 2, according to current procedures, on receipt of a registration or service request from a UE, an Access and Mobility Management Function (AMF)/Security Anchor Function (SEAF) generates an authentication request, which is passed to a Unified Data Management (UDM)/Authentication credential Repository and Processing Function (ARPF)/Subscription Identifier De-Concealing Function (SIDF). The UDM/ARPF/SIDF generates an Authentication Vector (AV), from which Home Environment (HE) and Serving Environment (SE) AVs may be generated, allowing the UE to be provided with an Authentication token AUTN for authentication of the network and to calculate an authentication parameter RES* or AUTS. The authentication parameter is verified by an Authentication Server Function (AUSF), and authentication of the UE is confirmed to the UDM and to the UE.

In the event of a SQN failure, requiring SQN re-synchronisation, an additional message exchange sequence (messages 10 to 15 in FIGS. 1 and 2) is performed between the UE and the different network entities.

The existing SQN re-synchronisation procedure represents one of several issues with the AKA procedures illustrated in FIGS. 1 and 2. The existing SQN re-synchronisation procedure is inefficient when handling massive SQN failure cases, which would occur if an UDM/ARPF nodes were to fail and restart with previously stored SQN values for UEs. As illustrated in FIGS. 1 and 2, the existing SQN re-synchronisation procedure introduces considerable additional message traffic, and this at a time of high end-to-end network load owing to failure and recovery of the UDM/ARPF node.

Additionally, the lead time to establish connection between a UE and serving network for registration procedures and service request procedures is relatively long, owing to the multiple message exchanges between the UE and the network (including AMF/SEAF, AUSF and UDM/ARPF) for 5G security context setup. Once authentication has been executed successfully, additional messages are required to be sent by the AUSF (steps 23 and 24 in FIG. 1, and steps 22 and 23 in FIG. 2) to inform the UDM that the authentication of the UE is successful, allowing home control to be linked to subsequent procedures.

Finally, the download of XRES* and $K_{AUSF}$ (within the HE AV of step 5 and 14 in FIG. 1 and AV of step 5 and 14 of FIG. 2) represents a security issue for the existing procedures. Referring to FIG. 1, the UDM/ARPF downloads XRES* and $K_{AUSF}$ inside the HE AV to the AUSF before the UE has been authenticated successfully (at step 19 in FIG. 1). This download of XRES* and $K_{AUSF}$ before authentication of the UE means that a malicious third party could capture XRES* and $K_{AUSF}$ from the download and use XRES* in an authentication response from a fake UE in order to bypass the authentication procedure. The same part could later use $K_{AUSF}$ to set up a security context.

SUMMARY

It is an aim of the present disclosure to provide methods, a device, entities and a computer readable medium which at least partially address one or more of the challenges discussed above.

According to a first aspect of the present disclosure, there is provided a method for operating a wireless device that is operable to connect to a network. The method, performed by the wireless device, comprises generating a random value, generating a sequence number and assembling an authentication token from at least the generated sequence number. The method further comprises sending a message to an entity of the network requesting at least one of registration on the network or service over the network, the message including the generated random value and the authentication token.

According to examples of the present disclosure, the entity may be a physical entity or a virtual entity such as a Virtualised Network Function (VNF). The network may be a 3GPP network and the entity may be an Access and Mobility Management Function (AMF)/Security Anchor Function (SEAF). According to examples of the present disclosure, the wireless device may be a UE and the message may further comprise either NAS Registration Request or NAS Service Request with an identifier of the wireless device such as a SUCI or 5G-GUTI.

According to examples of the present disclosure, the method may further comprise receiving a message from the network entity, the message comprising an authentication parameter, calculating an authentication parameter by inputting at least the random value to an authentication function, and comparing the received authentication parameter with the calculated authentication parameter.

According to examples of the present disclosure, the message received from the network may comprise a NAS Security Mode Command.

According to examples of the present disclosure, the method may further comprise, if the received and calculated authentication parameters are the same, sending a message to the network entity indicating that authentication is successful.

According to examples of the present disclosure, the message may comprise a NAS Security Mode Complete message.

According to examples of the present disclosure, the method may further comprise, if the received and calculated authentication parameters are the same, storing an authentication status of the network.

According to examples of the present disclosure, the method may further comprise, if the received and calculated authentication parameters are not the same, sending a message to the network entity indicating that authentication is not successful.

According to examples of the present disclosure, the message may comprise NAS Security Mode Reject message.

According to examples of the present disclosure, assembling an authentication token from at least the generated sequence number may comprise calculating a Message Authentication Code (MAC) on the basis of at least the generated sequence number and the generated random value, and concatenating at least the sequence number and the calculated MAC to form the authentication token.

According to examples of the present disclosure, assembling the authentication token may further comprise concatenating the sequence number and MAC with other parameters, such as an identifier of an AMF with which the wireless device is communicating.

According to examples of the present disclosure, generating a random value may comprise generating the random value according to a process employed for generating a random value in at least one entity in the network.

According to examples of the present disclosure, generating a sequence number may comprise generating the sequence number according to a process employed for generating a sequence number in at least one entity in the network. According to examples of the present disclosure, the entity may be an Authentication credential Repository and Processing Function (ARPF).

According to examples of the present disclosure, calculating an authentication parameter may comprise inputting at least the random value and key material shared with an entity in the network to an authentication function.

According to examples of the present disclosure, the key material may comprise a long term secret key K shared between the wireless device and the network. According to examples of the present disclosure, the entity with which the long term secret key K is shared may be a UDM/ARPF.

According to examples of the present disclosure, calculating an authentication parameter may further comprise calculating a derivative of a result of the authentication function.

According to examples of the present disclosure, calculating a derivative may comprise calculating a hash such as the Sha-256 hash. According to examples of the present disclosure, the network may be a 3GPP network and the authentication parameter may comprise at least one of RES*, HRES* and/or AUTS.

According to examples of the present disclosure, sending a message to an entity of the network requesting at least one of registration on the network or service over the network, the message including the generated random value and the authentication token, may comprise initiating an authentication procedure towards the network.

According to examples of the present disclosure, the authentication procedure may be a 5G AKA or EAP-AKA' or any other suitable authentication procedure.

According to examples of the present disclosure, the method may further comprise receiving a message from the network entity, the message indicating that the request for at least one of registration on the network or service over the network is rejected.

According to examples of the present disclosure, at least some of the method steps may be performed in a Universal Subscriber Identity Module (USIM) of the wireless device.

According to examples of the present disclosure, the network entity to which the message requesting registration/service is sent may be a core network entity, and the message may be sent to the core network entity via other network entities, including for example a radio network node which receives and forwards the message to the network entity.

According to another aspect of the present disclosure, there is provided a method for operating an entity in a network. The method, performed by the entity, comprises receiving a message from a wireless device requesting at least one of registration on the network or service over the network, the message including a random value and an authentication token assembled from at least a sequence number. The method further comprises sending a message to another network entity requesting authentication of the wireless device, the message including the random value and authentication token received in the message from the wireless device.

According to examples of the present disclosure, the entity may be a physical entity or a virtual entity such as a VNF. The entity may be an Access and Mobility Management Function (AMF)/Security Anchor Function (SEAF). The another network entity may be an Authentication Server Function (AUSF) or a UDM/ARPF/SIDF. The wireless device may be a UE.

According to examples of the present disclosure, the authentication request message may further comprise an identifier of the wireless device and a serving network name. The identifier may be received from the wireless device or based on an identifier received from the wireless device, and may for example be a SUCI or SUPI.

According to examples of the present disclosure, the authentication request message may be a Nausf-UEAuthentication_Authenticate Request message or a Nudm-UEAuthentication_Get Request message.

According to examples of the present disclosure, the method may further comprise receiving a message from the another network entity, the message comprising an authentication parameter, and forwarding the authentication parameter to the wireless device in a message.

According to examples of the present disclosure, the received message may be a Nausf-UEAuthentication_Authenticate Response message or a Nudm-UEAuthentication_Get Response message. According to examples of the present disclosure, the message may further comprise a key for use by the network entity.

According to examples of the present disclosure, the forwarded message may be a NAS Security Mode Command message.

According to examples of the present disclosure, the method may further comprise receiving a message from the wireless device indicating whether or not authentication in the wireless device has been successful.

According to examples of the present disclosure, the message may comprise either NAS Security Mode Complete or NAS Security Mode Reject.

According to examples of the present disclosure, the authentication token included in the message received from the wireless device may be assembled from at least a sequence number generated by the wireless device.

According to examples of the present disclosure, the message may comprise either a NAS Registration Request or a NAS Service Request.

According to examples of the present disclosure, the authentication token may comprise at least the sequence number concatenated with a Message Authentication Code calculated on the basis of at least the sequence number and the random value.

According to examples of the present disclosure, the method may further comprise receiving a message from the another network entity, the message rejecting authentication of the wireless device, and forwarding the message rejecting authentication of the wireless device to the wireless device in a message.

According to examples of the present disclosure, the network may be a 3GPP network and the authentication parameter may comprise at least one of RES*, HRES* and/or AUTS.

According to examples of the present disclosure, the entity may comprise a node having at least one of the functions Access and Mobility Management Function and/or Security Anchor Function, and the another network entity may comprise a node having at least the function Authentication Server Function, or at least one of the functions Unified Data Management, Authentication Credential Repository and Processing Function, and/or Subscription Identifier De-Concealing Function.

According to another aspect of the present disclosure, there is provided a method for operating an entity in a network. The method, performed by the entity, comprises receiving a message from another entity in the network, the message requesting authentication of a wireless device and including a random value and an authentication token assembled from at least a sequence number, and comparing the sequence number to an authentication criterion.

According to examples of the present disclosure, the entity may be a physical entity or a virtual entity such as a VNF. The entity may be a UDM/ARPF/SIDF. The another network entity may be an AUSF or an AMF/SEAF. The wireless device may be a UE.

According to examples of the present disclosure, the authentication request message may further comprise an identifier of the wireless device and a serving network name. The identifier may be SUCI or SUPI. The authentication request message may be a Nudm-UEAuthentication_Get Request message.

According to examples of the present disclosure, the method may further comprise, if the sequence number matches the authentication criterion, storing the sequence number, calculating an authentication parameter, and sending a message to the another entity, the message including the calculated authentication parameter.

According to examples of the present disclosure, the message may be a Nudm-UEAuthentication_Get Response message.

According to examples of the present disclosure, the method may further comprise, if the sequence number does not match the authentication criterion, sending a message to the another network entity rejecting authentication of the wireless device.

According to examples of the present disclosure, the message may indicate SQN failure.

According to examples of the present disclosure, the authentication token included in the message received from the wireless device may be assembled from at least a sequence number generated by the wireless device.

According to examples of the present disclosure, the authentication token may comprise at least the sequence number concatenated with a Message Authentication Code calculated on the basis of at least the sequence number and the random value.

According to examples of the present disclosure, the method may further comprise validating the Message Authentication Code.

According to examples of the present disclosure, the method may further comprise, if the validation of the Message Authentication Code is successful, proceeding to compare the sequence number to an authentication criterion, and, if the validation of the Message Authentication Code is not successful, sending a message to the another network entity rejecting authentication of the wireless device. The message may indicate MAC failure.

According to examples of the present disclosure, calculating an authentication parameter may comprise inputting at least the random value and key material shared with the wireless device to an authentication function.

According to examples of the present disclosure, the key material may comprise a long term secret key K shared between the wireless device and the entity.

According to examples of the present disclosure, calculating an authentication parameter may further comprise calculating a derivative of a result of the authentication function.

According to examples of the present disclosure, calculating a derivative may comprise calculating a hash such as the Sha-256 hash. According to examples of the present disclosure, the network may be a 3GPP network and the authentication parameter may comprise at least one of RES*, HRES* and/or AUTS.

According to examples of the present disclosure, the method may further comprise, if the sequence number matches the authentication criterion, deriving a key, and including the derived key with the calculated authentication parameter in the message to the another entity.

According to examples of the present disclosure, the steps of deriving a key and including the key with the calculated authentication parameter in the message to the another entity may additionally be conditional upon successful validation of the Message Authentication Code.

According to examples of the present disclosure, the derived key may comprise a key for use by the another network entity. According to examples of the present disclosure, the key may be $K_{AUSF}$ or $K_{SEAF}$, depending upon the nature of the another network entity.

According to examples of the present disclosure, the entity may comprise a node having at least the function Authentication Server Function, or at least one of the functions: Unified Data Management, Authentication Credential Repository and Processing Function, and/or Subscription Identifier De-Concealing Function, and the another network entity may comprise a node having at least one of the functions: Access and Mobility Management Function and/or Security Anchor Function.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a wireless device that is operable to connect to a network. The wireless device comprises a processor and a memory, the memory containing instructions executable by the processor such that the wireless device is operable to generate a random value, generate a sequence number, assemble an authentication token from at least the generated sequence number, and send a message to an entity of the network requesting at least one of registration on the network or service over the network, the message including the generated random value and the authentication token.

According to examples of the present disclosure, the wireless device may be further operable to carry out a method according to any one of the preceding aspects or examples of the present disclosure.

According to another aspect of the present disclosure, there is provided a wireless device that is operable to connect to a network. The wireless device is adapted to generate a random value, generate a sequence number, assemble an authentication token from at least the generated sequence number, and send a message to an entity of the network requesting at least one of registration on the network or service over the network, the message including the generated random value and the authentication token.

According to examples of the present disclosure, the wireless device may be further adapted to carry out a method according to any one of the preceding aspects or examples of the present disclosure.

According to another aspect of the present disclosure, there is provided an entity in a network. The entity comprises a processor and a memory, the memory containing instructions executable by the processor such that the entity is operable to receive a message from a wireless device requesting at least one of registration on the network or service over the network, the message including a random value and an authentication token assembled from at least a sequence number, and send a message to another network entity requesting authentication of the wireless device, the message including the random value and authentication token received in the message from the wireless device.

According to examples of the present disclosure, the entity may be further operable to carry out a method according to any one of the preceding aspects or examples of the present disclosure.

According to another aspect of the present disclosure, there is provided an entity in a network. The entity is adapted to receive a message from a wireless device requesting at least one of registration on the network or service over the network, the message including a random value and an authentication token assembled from at least a sequence number, and send a message to another network entity requesting authentication of the wireless device, the message including the random value and authentication token received in the message from the wireless device.

According to examples of the present disclosure, the entity may be further adapted to carry out a method according to any one of the preceding aspects or examples of the present disclosure.

According to another aspect of the present disclosure, there is provided an entity in a network. The entity comprises a processor and a memory, the memory containing instructions executable by the processor such that the entity is operable to receive a message from another entity in the network, the message requesting authentication of a wireless device and including a random value and an authentication token assembled from at least a sequence number, and compare the sequence number to an authentication criterion.

According to examples of the present disclosure, the entity may be further operable to carry out a method according to any one of the preceding aspects or examples of the present disclosure.

According to another aspect of the present disclosure, there is provided an entity in a network. The entity is adapted to receive a message from another entity in the network, the message requesting authentication of a wireless device and including a random value and an authentication token assembled from at least a sequence number, and compare the sequence number to an authentication criterion.

According to examples of the present disclosure, the entity may be further adapted to carry out a method according to any one of the preceding aspects or examples of the present disclosure.

Examples of the present disclosure ensure that a SQN re-synchronization procedure can be avoided completely, as well as reducing the lead time to establish NAS connection and a PDU session between a UE and a serving network. In addition, security of the 5G core network may be improved by avoiding the exposure of $K_{AUSF}$ and RES* outside the UDM/ARPF before the UE is authenticated successfully.

BRIEF DESCRIPTION OF THE DRAWINGS

For a better understanding of the present invention, and to show more clearly how it may be carried into effect, reference will now be made, by way of example, to the following drawings, in which:

FIG. 3 is a flow chart illustrating process steps in a method for operating a wireless device that is operable to connect to a network;

FIG. 4 is a flow chart illustrating process steps in a method for operating an entity in a network;

FIG. 5 is a flow chart illustrating process steps in another method for operating an entity in a network;

DETAILED DESCRIPTION

Figure 1:
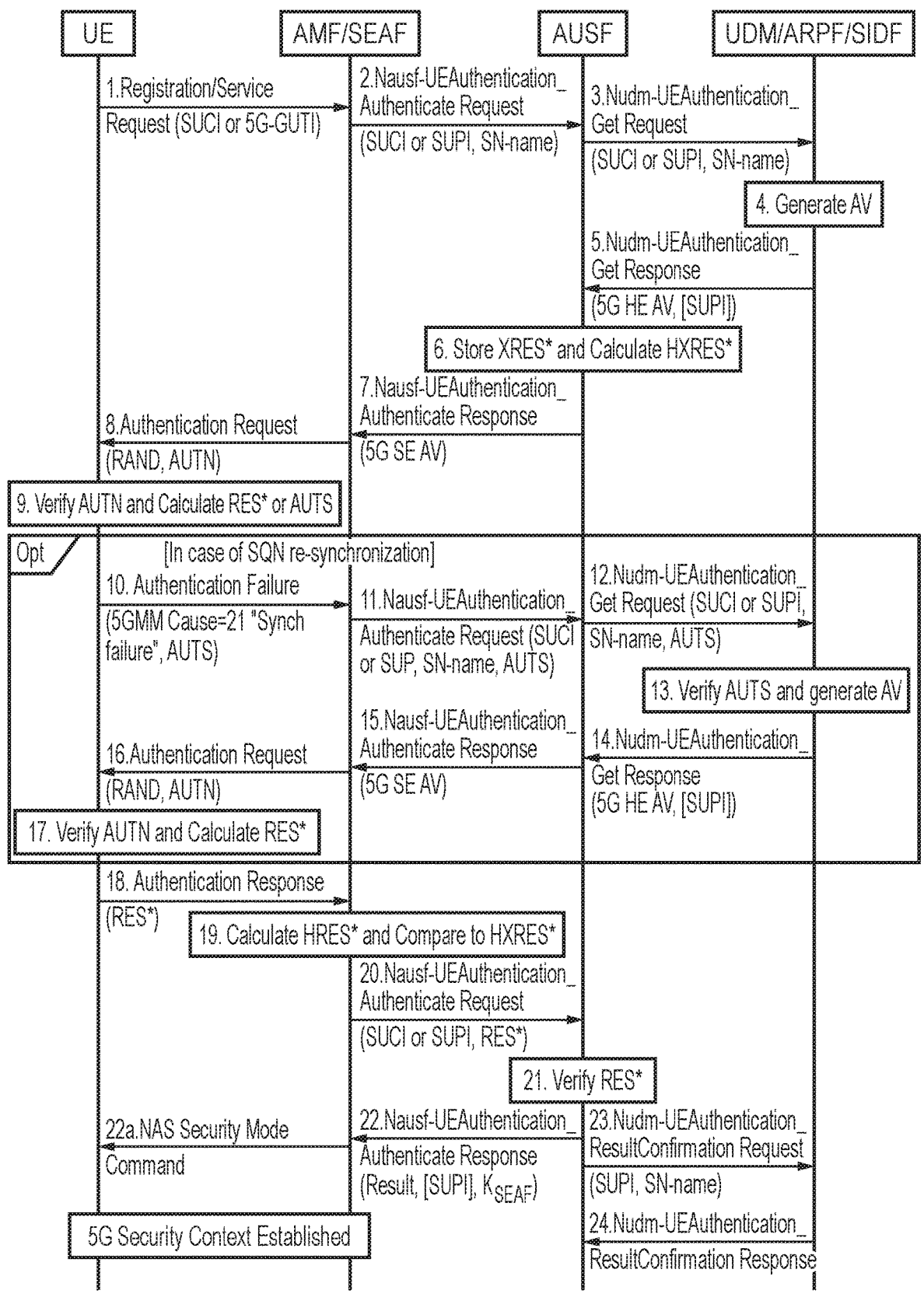
FIG. 1 is a message sequence diagram illustrating an authentication procedure for 5G AKA.

The following sets forth specific details of certain examples according to the present disclosure for the purposes of explanation and not limitation. It will be appreciated by one skilled in the art that other examples may be envisaged employing different specific details, or different combinations of specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description refers to a wireless device, or user equipment (UE), it should be understood by those skilled in the art that "UE" is a non-limiting term comprising any mobile or wireless device, terminal or node equipped with a radio interface allowing for at least one of: transmitting signals in uplink (UL) and receiving and/or measuring signals in downlink (DL). A wireless device herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. Examples of wireless device include UE, target device, device to device (D2D) UE, machine type UE or UE capable of machine to machine (M2M) communication, PDA, tablet computer, mobile terminals, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, etc.

The present disclosure also refers network "entities". A network entity may be a physical or virtual entity, and may for example comprise a network node such as a core network node, or a function such as a Virtualised Network Function, which function may operate as a core network node.

Aspects of the present disclosure provide methods according to which Authentication and Key Agreement (AKA) procedures may be initiated by the wireless device, as opposed to the network. The initiation of authentication may be combined with initiation of other procedures, such as a registration or service request. Examples of the present disclosure are applicable for both 5G AKA and EAP-AKA' authentication as practiced in existing networks such as 3GPP LTE networks, 5G networks and future network evolutions after 5G.

FIGS. 3, 4 and 5 are flow charts illustrating process steps in a wireless device and network entities according to aspects of the present disclosure. Together, the actions of the wireless device and network entities provide for authentication of a wireless device at the initiation of the wireless device, so addressing many of the challenges discussed above with reference to existing procedures.

FIG. 3 is a flow chart illustrating process steps in a method 300 for operating a wireless device that is operable to connect to a network. The method is performed by the wireless device and comprises, in a first step 302, generating a random value. The method then comprises, in step 304, generating a sequence number and, in step 306, assembling an authentication token from at least the generated sequence number. In step 308, the method comprises sending a message to an entity of the network requesting at least one of registration on the network or service over the network, the message including the generated random value and the authentication token.

The entity may be a physical entity or a virtual entity such as a VNF. The network may be a 3GPP network and the entity may be an AMF/SEAF. The message may comprise either a NAS Registration Request or NAS Service Request with an identifier of the wireless device such as a SUCI or 5G-GUTI.

FIG. 4 is a flow chart illustrating process steps in a method 400 for operating an entity in a network. The entity may be a physical entity or a virtual entity such as a VNF. The entity may be an AMF/SEAF. The method, performed by the entity, comprises, in step 402, receiving a message from a wireless device requesting at least one of registration on the network or service over the network, the message including a random value and an authentication token assembled from at least a sequence number. The method further comprises, at step 404, sending a message to another network entity requesting authentication of the wireless device, the message including the random value and authentication token received in the message from the wireless device. The another network entity may be an AUSF or a UDM/ARPF/SIDF and the authentication request message may comprise an identifier of the wireless device and a serving network name. The identifier may be received from the wireless device or based on an identifier received from the wireless device, and may for example be a SUCI or SUPI. The authentication request message may be a Nausf-UEAuthentication_Authenticate Request message or a Nudm-UEAuthentication_Get Request message.

FIG. 5 is a flow chart illustrating process steps in a method 500 for operating an entity in a network. The entity may be a physical entity or a virtual entity such as a VNF. The entity may be a UDM/ARPF/SIDF. The method, performed by the entity, comprises, in step 502, receiving a message from another entity in the network, the message requesting authentication of a wireless device and including a random value and an authentication token assembled from at least a sequence number. The another network entity may be an AUSF or an AMF/SEAF. The authentication request message may further comprise an identifier of the wireless device and a serving network name. The identifier may be SUCI or SUPI. The authentication request message may be a Nudm-UEAuthentication_Get Request message. The method further comprises, in step 506, comparing the sequence number to an authentication criterion.

Figure 6:
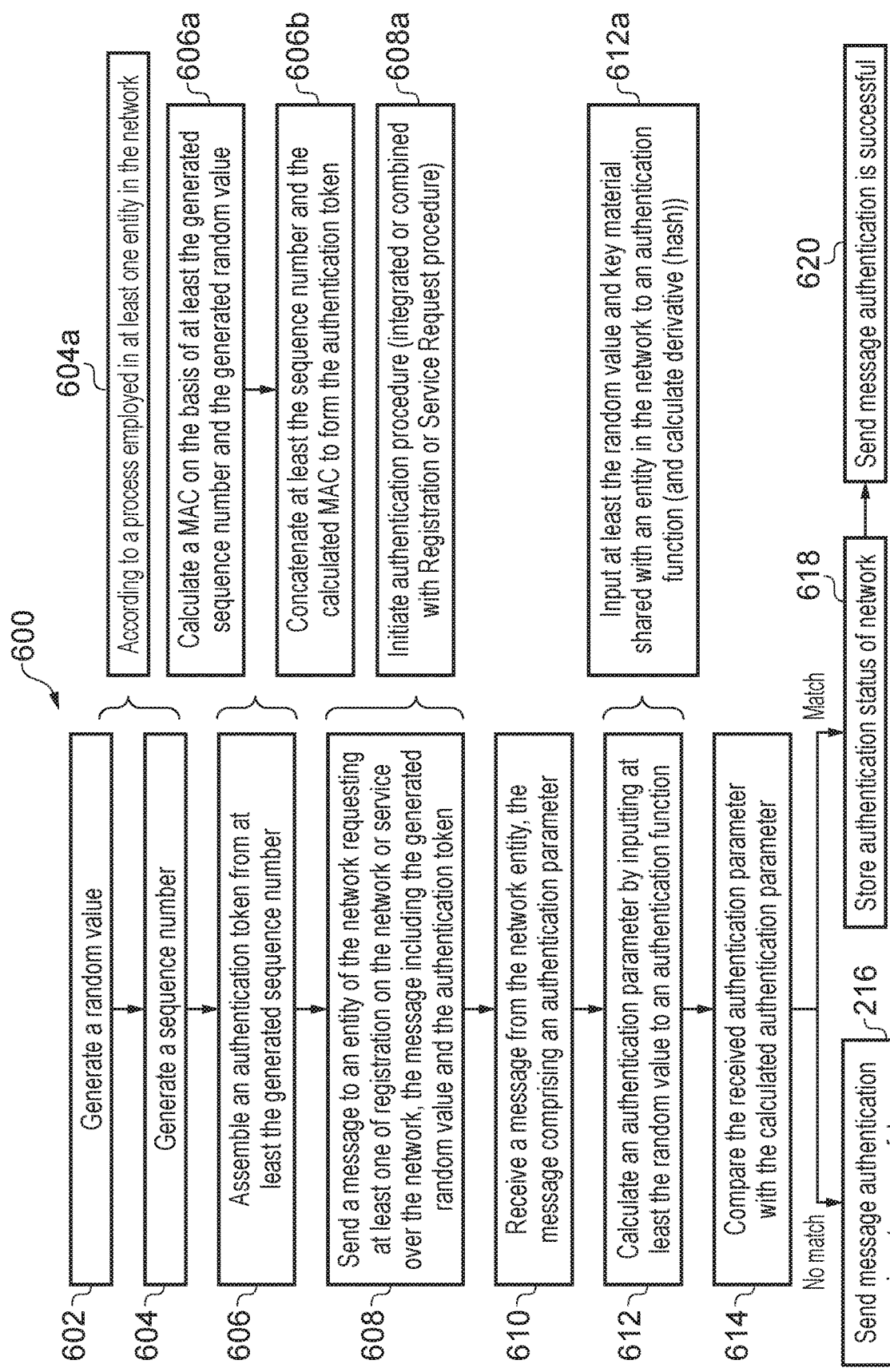
FIG. 6 is a flow chart illustrating process steps in another method for operating a wireless device that is operable to connect to a network.

FIG. 6 is a flow chart illustrating process steps in another example of method 600 for operating a wireless device operable to connect to a network.

The steps of the method 600 illustrate one way in which the steps of the method 300 may be implemented and supplemented in order to achieve the above discussed and additional functionality. As for the method of FIG. 3 above, the wireless device may be any kind of wireless device such as a UE or any other the other example devices discussed above. At eats some of the steps of the method 600 may be performed in a Universal Subscriber Identity Module (USIM) of the wireless device.

Referring to FIG. 6, in a first step 602, the wireless device generates a random value, for example according to a process employed for generating a random value in at least one entity in the network. In step 604, the wireless device generates a sequence number; for example according to a process employed for generating a sequence number in at least one entity in the network. The entity may be a core network node, such as a UDM/ARPF.

In step 606, the wireless device assembles an authentication token from at least the generated sequence number. As illustrated in FIG. 6, this may comprise calculating a Message Authentication Code (MAC) on the basis of at least the generated sequence number and the generated random value in step 606a, and concatenating at least the sequence number and the calculated MAC to form the authentication token in step 606b. Assembling the authentication token may further comprise concatenating the sequence number and MAC with other parameters, such as an identifier of an AMF with which the wireless device is communicating.

In step 608, the wireless device sends a message to an entity of the network requesting at least one of registration on the network or service over the network, the message including the generated random value and the authentication token. The network entity to which the message requesting registration/service is sent may be a core network entity, and the message may be sent to the core network entity via other network entities, including for example a radio network node which receives and forwards the message to the network entity. The entity may be a physical entity or a virtual entity such as a VNF. The network may be a 3GPP network and the entity may be an AMF/SEAF. The message may further comprise either a NAS Registration Request or NAS Service Request with an identifier of the wireless device such as a SUCI or 5G-GUTI. The sending of the request for service or registration, including the generated random value and authentication token, may constitute initiation of an authentication procedure for the device. As illustrated in step 608a. This initiation of authentication may be combined or integrated with initiation of the procedure requested by the message, (registration or service). The initiated authentication procedure may comprise a 5G AKA or EAP-AKA' or any other suitable authentication procedure.

If authentication of the wireless device is unsuccessful, the wireless device may receive a message (not shown), from the network entity (AMF/SEAF), indicating that the request for at least one of registration on the network or service over the network is rejected.

If authentication of the wireless device by the network is successful, the wireless device receives, in step 610, a message from the network entity, the message comprising an authentication parameter. The message received from the network may comprise a NAS Security Mode Command and the authentication parameter may comprise RES*, HRES* and/or AUTS. In step 612, the wireless device calculates an authentication parameter by inputting at least the random value to an authentication function. As illustrated in step 608a, calculating an authentication parameter may further comprise inputting at least the random value and key material shared with an entity in the network to the authentication function, and may further comprise calculating a derivative such as a Hash of the result. Any suitable Hash function may be sued, such as the Sha-256 hash. The key material may comprise a long term secret key K shared between the wireless device and the network. The entity with which the long term secret key K is shared may be a UDM/ARPF.

In step 614, the wireless device compares the received authentication parameter with the calculated authentication parameter. If the received and calculated authentication parameters are not the same, then in step 616, the wireless device sends a message to the network entity indicating that authentication is not successful. The message may comprise NAS Security Mode Reject. If the received and calculated authentication parameters are the same, then in step 618, the wireless device stores an authentication status of the network and, in step 620, the wireless device sends a message to the network entity indicating that authentication is successful. The message may comprise NAS Security Mode Complete.

According to the above process flow, the network thus first authenticates the wireless device, initiated by the sending of a message by the wireless device that includes a random value and an authentication token. If authentication of the wireless device is successful, the wireless device then receives the necessary parameters to authenticate the network.

Figure 7:
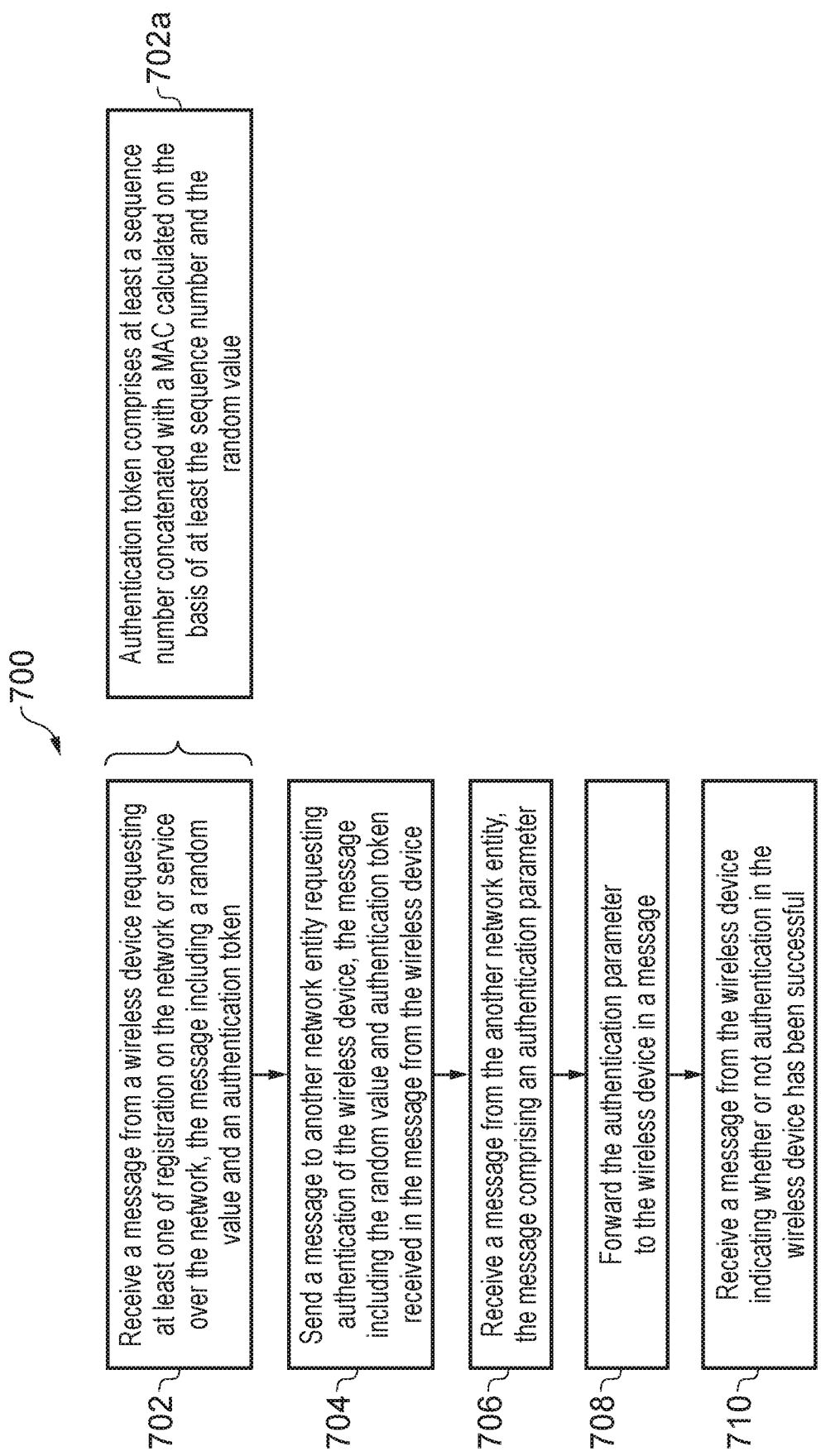
FIG. 7 is a flow chart illustrating process steps in another method for operating an entity in a network.

The method 600 may be complimented by methods 700 and 800 performed by network entities. FIG. 7 is a flow chart illustrating process steps in another example of method 700 for operating an entity in a network. The steps of the method 700 illustrate one way in which the steps of the method 400 may be implemented and supplemented in order to achieve the above discussed and additional functionality. The entity may be a physical entity or a virtual entity such as a VNF. The entity may be an AMF/SEAF.

Referring to FIG. 7, in a first step 702, the network entity receives a message from a wireless device requesting at least one of registration on the network or service over the network, the message including a random value and an authentication token assembled from at least a sequence number generated by the wireless device. As illustrated in step 702a, the authentication token may comprise at least the sequence number concatenated with a MAC calculated on the basis of at least the sequence number and the random value.

In step 704, the network entity sends a message to another network entity requesting authentication of the wireless device, the message including the random value and authentication token received in the message from the wireless device. The another network entity may be an AUSF or may be a UDM/ARPF/SIDF. The wireless device may be a UE. The authentication request message may further comprise an identifier of the wireless device and a serving network name. The identifier may be received from the wireless device or based on an identifier received from the wireless device, and may for example be a SUCI or SUPI. The authentication request message may be a Nausf-UEAuthentication_Authenticate Request message or a Nudm-UEAuthentication_Get Request message.

If authentication of the wireless device is not successful, the network entity may receive a message (not shown) from the another network entity, the message rejecting authentication of the wireless device, and may forward the message rejecting authentication of the wireless device to the wireless device in a message.

If authentication of the wireless device by the network is successful, in step 706, the network entity receives receiving a message from the another network entity, the message comprising an authentication parameter, and in step 708, the network entity forwards the authentication parameter to the wireless device in a message. The received message may be a Nausf-UEAuthentication_Authenticate Response message or a Nudm-UEAuthentication_Get Response message. The message may further comprise a key for use by the network entity. The forwarded message may be a NAS Security Mode Command message.

In step 710, the network entity receives a message from the wireless device indicating whether or not authentication of the network in the wireless device has been successful. The message may comprise either a NAS Security Mode Complete or a NAS Security Mode Reject message.

Figure 8:
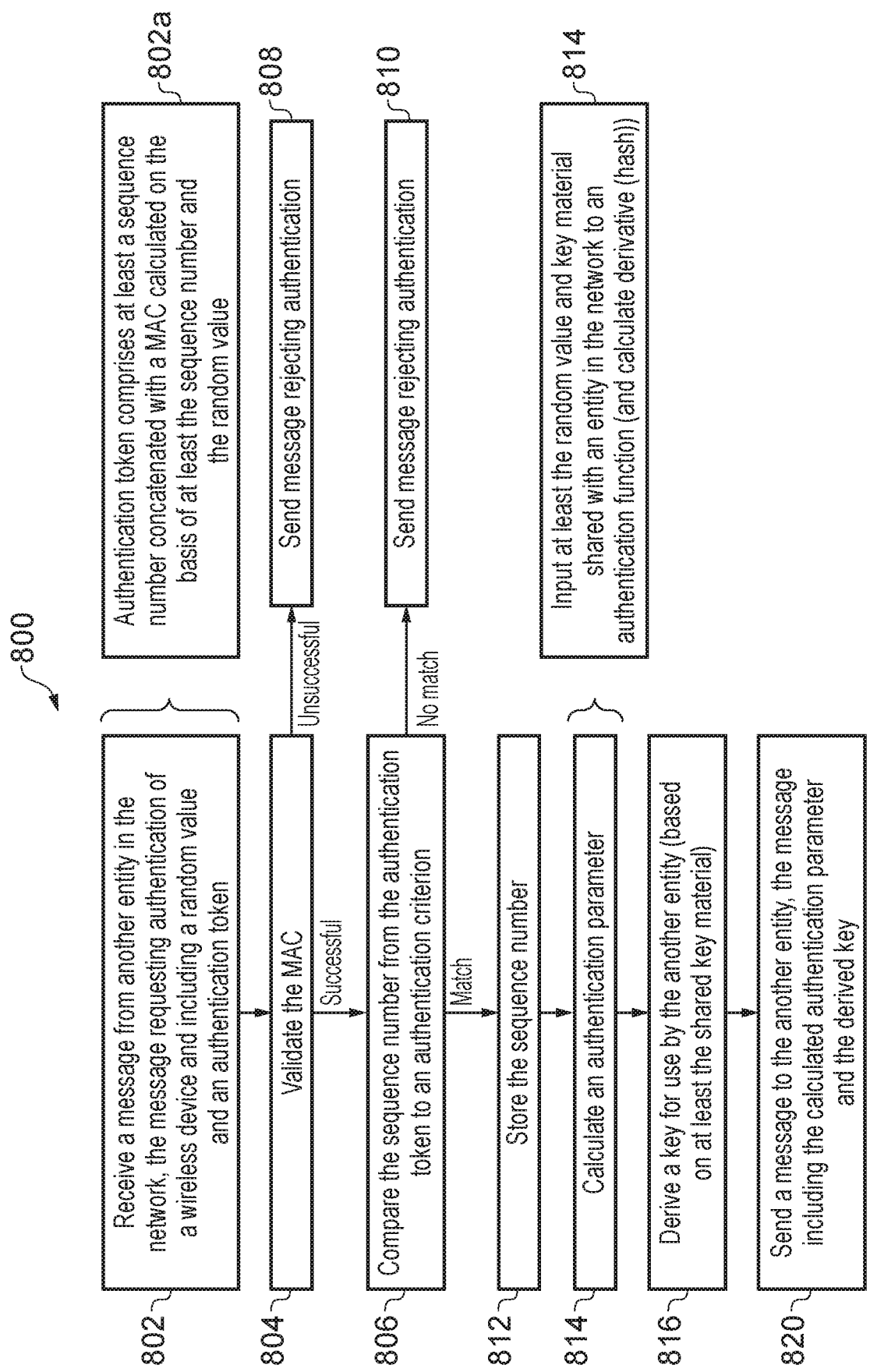
FIG. 8 is a flow chart illustrating process steps in another method for operating an entity in a network.

The methods 600 and 700 may be complimented by a method 800 performed by a network entity. FIG. 8 is a flow chart illustrating process steps in another example of method 800 for operating an entity in a network. The steps of the method 800 illustrate one way in which the steps of the method 500 may be implemented and supplemented in order to achieve the above discussed and additional functionality. The entity may be a physical entity or a virtual entity such as a VNF. The entity may be an UDM/ARPF/SIDF.

Referring to FIG. 8, in step 802, the network entity receives a message from another entity in the network, the message requesting authentication of a wireless device and including a random value and an authentication token assembled from at least a sequence number generated by the wireless device. As illustrated in step 802a, in some examples, the authentication token comprises at least the sequence number concatenated with a MAC calculated on the basis of at least the sequence number and the random value. The another network entity may be an AUSF or an AMF/SEAF. The wireless device may be a UE. The authentication request message may further comprise an identifier of the wireless device and a serving network name. The identifier may be SUCI or SUPI. The authentication request message may be a Nudm-UEAuthentication_Get Request message.

In step 804, the network entity validates the MAC. If the validation of the MAC is not successful, the network entity sends a message to the another network entity rejecting authentication of the wireless device in step 808. The message may indicate MAC failure. If the validation of the MAC is successful, the network entity proceeds to compare the sequence number to an authentication criterion in step 806. If the sequence number does not match the authentication criterion, then the network entity sends a message to the another network entity rejecting authentication of the wireless device in step 810. The message may indicate SQN failure.

If the sequence number matches the authentication criterion, the network entity stores the sequence number in step 812 and calculates an authentication parameter in step 814. As illustrated in step 814a, this may comprise inputting at least the random value and key material shared with the wireless device to an authentication function, and may further comprise calculating a derivative such as a Hash of the result. the Hash may be any suitable Hash function, such as a Sha-256 Hash. The key material may comprise a long term secret key K shared between the wireless device and the entity.

In step 816, the network entity derives a key, which may be for use by the another network entity, and in step 820, the network entity sends a message to the another entity, the message including the calculated authentication parameter and including the derived key. The message may be a Nudm-UEAuthentication_Get Response message.

The methods 600, 700 and 800 described above may cooperate to enable mutual authentication by a wireless device and network at the initiation of the wireless device. The methods may be implemented in a range of different wireless devices and networks. FIGS. 9 to 12 are message flow diagrams for example implementations of such methods within the context of 5G AKA and EAP-AKA' authentication.

Figure 9:
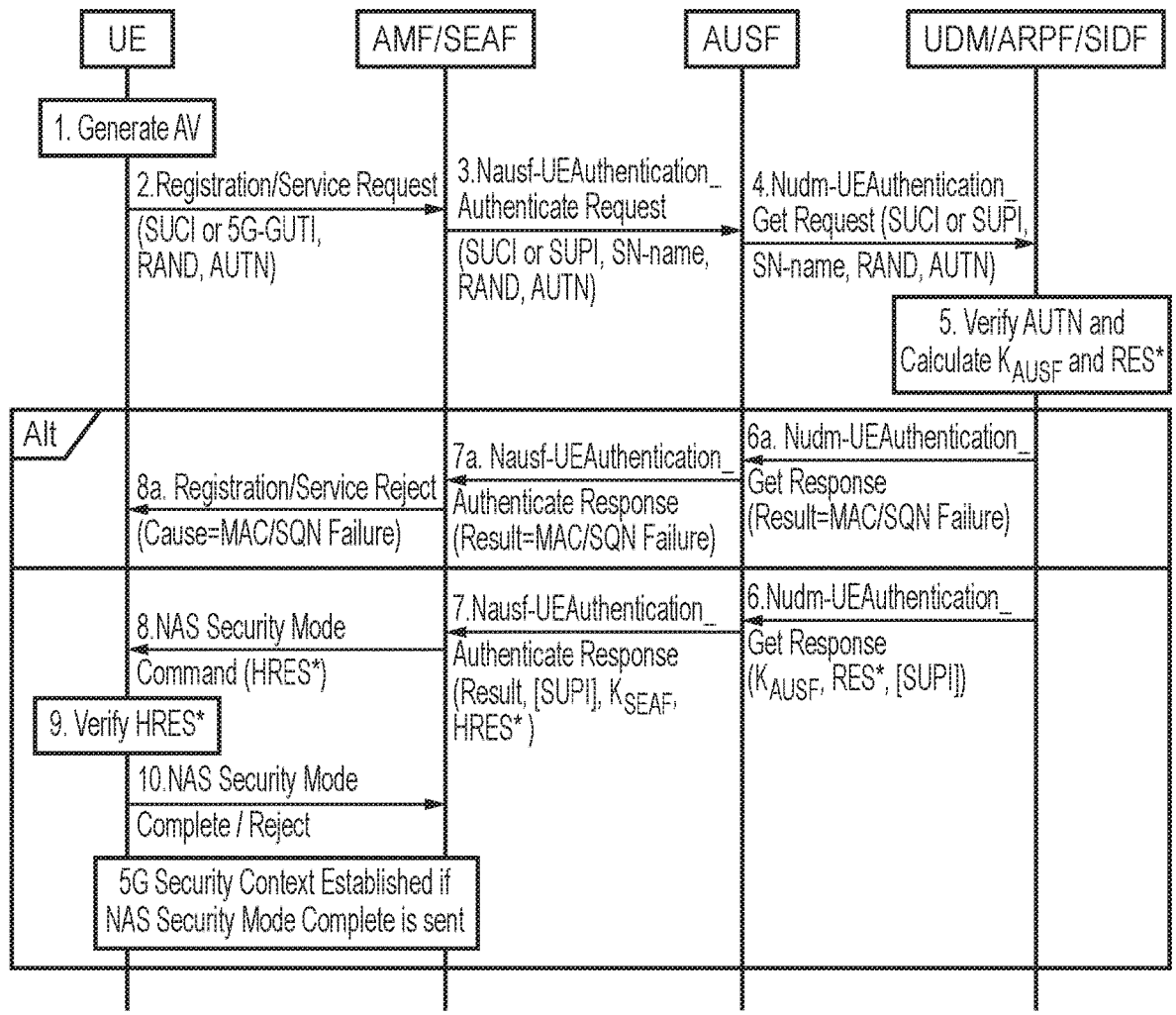
FIG. 9 is a flow diagram illustrating an implementation of methods according to the present disclosure in a 5G AKA procedure.

The FIG. 9 illustrates an implementation of methods according to the present disclosure in a 5G AKA procedure. By comparison with the 5G AKA procedure illustrated in FIG. 1, it can be seen that the procedure implementing methods according to the present disclosure is considerably simplified, with reduced message traffic. Steps 6, 8 to 22, 23 and 24 have all been removed from the procedure of FIG. 1. The procedure of FIG. 9 is discussed below with reference to a wireless device in the firm of a UE, a network entity in the form of an AMF/SEAF and another network entity in the form of a UDM/ARPF/SIDF. The procedure also involves an AUSF.

In Step 1, the UE requests generation of authentication vectors in its USIM card. The UE then includes the random value RAND and authentication token AUTN of the authentication vector in a registration request or service request message sent in Step 2, so initiating registration or service request procedures. In Steps 3 and 4, the AMF/SEAF and AUSF transfer RAND and AUTN transparently to the UDM/ARPF. In step 5, the UDM/ARPF verifies the AUTN received from the UE. This may comprise verifying both a sequence number SEQ and a MAC included in AUTN. In Step 5, the UDM/ARPF first validates the MAC, and if the MAC is not correct, the UDM/ARPF rejects the authentication request and indicates "MAC Failure". If the MAC is correct, the UDM/ARPF further validates SQN (e.g. $0<SEQ-SEQ_{HE}\leq\Delta$, where $\Delta$ is defined in 3GPP TS 33.102). If SQN is in the correct range, the UDM/ARPF stores the received SQN value. Otherwise, the UDM/ARPF rejects the authentication request and indicates "SQN Failure".

If AUTN is not accepted, meaning the UE is not a legal terminal, then the UDM/ARPF sends a response message indicating either or both of SQN or MAC failure in step 6a. This message is forwarded back via the AUSF and AMF/SEAF in steps 7a and 8a to the UE. If AUTN is accepted, meaning the UE is a legal terminal, the UDM/ARPF downloads the key material $K_{AUSF}$ and authentication parameter RES* inside response message in Step 6. The AUSF generates HRES* from RES* and generates $K_{SEAF}$ from $K_{AUSF}$ for forwarding to the AMF/SEAF in step 7. In step 8, the AMF/SEAF forwards HRES* to the UE in a NAS Security Mode Command.

It will be appreciated that the validation of SQN by the UDM/ARPF can forbid the replay of an old authentication request from a fake UE, and only if both MAC and SQN pass the validation, does the UDM/ARPF calculate $K_{AUSF}$ and RES* and store the authentication status of UE.

The authentication parameter RES* is illustrated in FIG. 9 based on an assumption that the UE always generates a different RAND, so that it is not possible to allow the replay of an old authentication response by a fake network. This is a similar assumption to that made for legacy situations, in which it is assumed that the authentication center in a home network generates the random value RAND with a different value each time so that a fake UE cannot replay an old authentication response with an old value of RES*.

The authentication status after steps 5 to 8 depends only on the result of the network authenticating the UE, as the UE has not yet authenticated the network. This does not pose a security concern as the RES sent from the UDM/ARPF in the home network is always correct. In the event that, as a consequence of using RES*, a security issue is envisaged in the potential replay of an old authentication procedure from the network side, AUTS may be used instead. AUTS uses SQN as an input of its calculation and so would address any potential risk of this nature.

Returning to FIG. 9, in Step 9, the UE verifies the received HRES* with a locally calculated value. If the same value is obtained in the local calculation, the UE sends a NAS Security Mode Complete message and continues the remaining steps of the current procedure. If the locally calculated HRES* value does not match that receives from the network, then the UE sends a NAS Security Mode Reject message and the procedure is terminated.

Comparison of the process flow of FIG. 9 with that of FIG. 1 allows for an appreciation of many of the challenges identified earlier in the present disclosure are addressed by example methods disclosed herein. Firstly, the SQN re-synchronization procedure is achieved at Step 5, far earlier and will less message traffic than in the existing procedure. In addition, the lead time to establish the connection between UE and serving network is shortened by at least half, even without considering a potential SQN re-synchronization. It can be seen that the UDM/ARPF doesn't download $K_{AUSF}$ and RES* in Step 6 unless the current UE is authenticated successfully in Step 5, thus addressing the security risk that a malicious third party could capture these parameters during attempted authentication of a non legal UE. Finally, the UDM/ARPF knows whether the current UE is authenticated successfully at Step 5, without the need for an additional message from the AUSF.

It is envisaged according to examples of the present disclosure that the USIM card in the UE stores all the needed user confidential data for authentication. According to examples of the present disclosure, it may be mandatory to perform an authentication procedure before the UE accesses the network.

Figure 10:
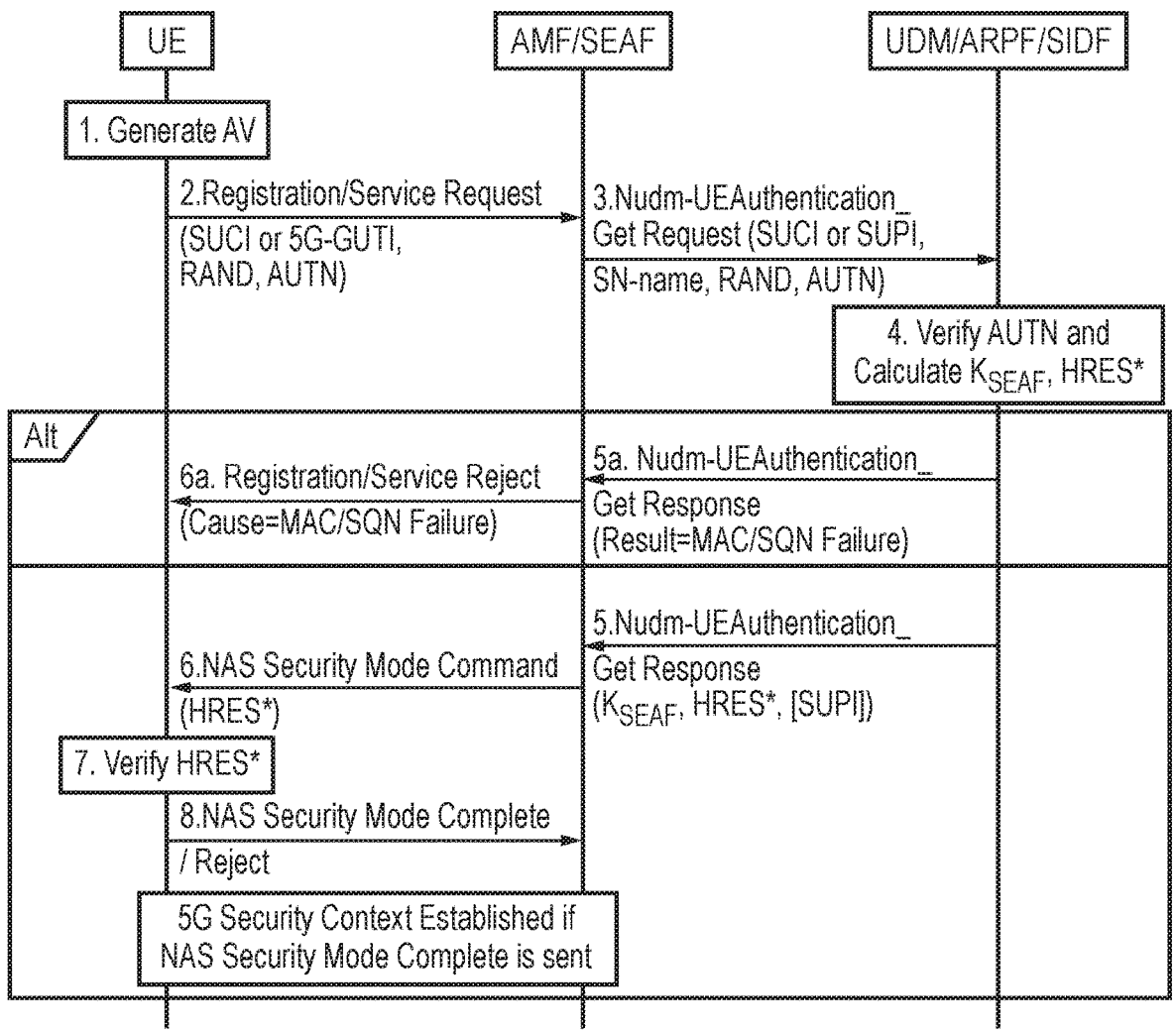
FIG. 10 is a flow diagram illustrating another implementation of methods according to the present disclosure in a 5G AKA procedure.

As an be appreciated from FIG. 9, the AUSF node doesn't provide any extra value for the enhanced authentication procedure for 5G AKA, other than transparently transferring authentication data. In some examples it may therefore be envisaged to simplify the network topology to remove the AUSF. FIG. 10 illustrates a further simplified authentication procedure according to examples of the present disclosure, in which the AUSF has been removed. Comparing with the procedure in FIG. 9, it can be seen that at step 4, the UDM/ARPF calculates HRES* instead of RES*, as only HRES* can be used in serving network. Additionally, the UDM/ARPF derives and sends $K_{SEAF}$, as opposed to $K_{AUSF}$.

Figure 2:
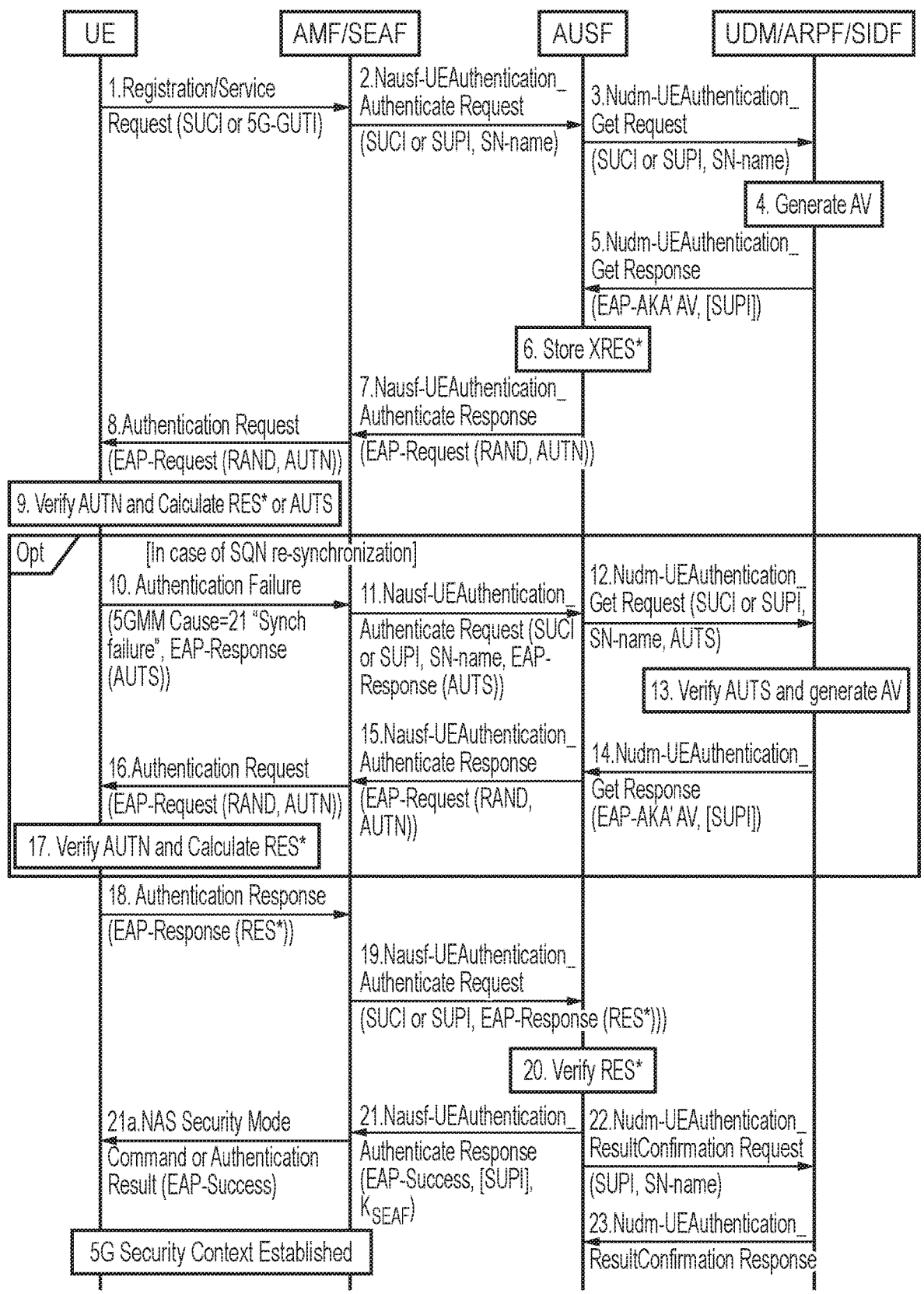
FIG. 2 is a message sequence diagram illustrating an authentication procedure for Extensible Authentication Protocol AKA'.
Figure 11:
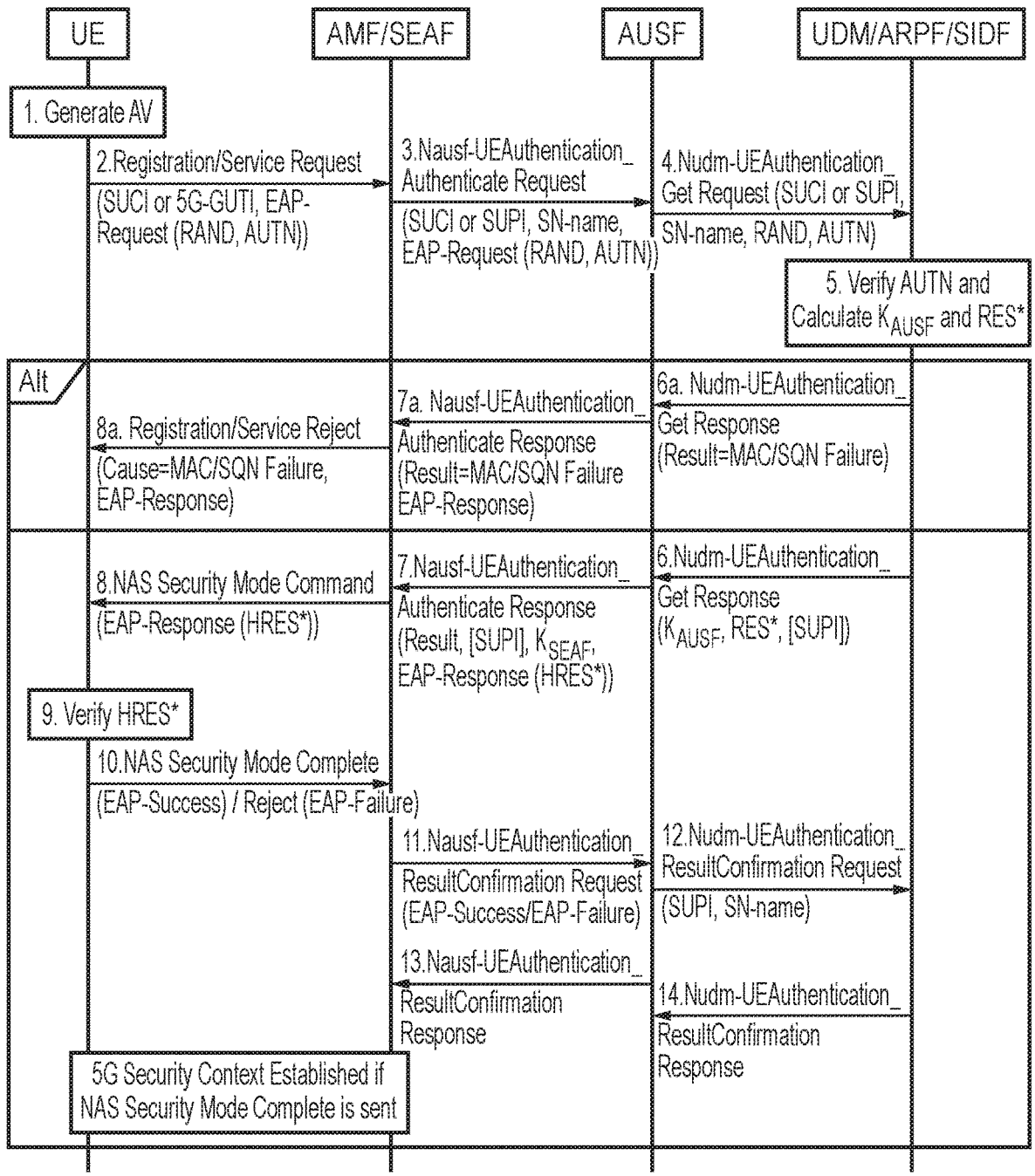
FIG. 11 is a flow diagram illustrating an implementation of methods according to the present disclosure in an EAP-AKA' procedure.

A similar implementation to that discussed above with reference to FIGS. 9 and 10 can be taken with the EAP-AKA' authentication procedure. According to this implementation of methods according to the present disclosure, the UE initiates the EAP authentication procedure instead of network. FIG. 11 illustrates an implementation of methods according to the present disclosure in an EAP-AKA' procedure. By comparison with the EAP-AKA' procedure illustrated in FIG. 2, it can be seen that the procedure implementing methods according to the present disclosure is considerably simplified, with reduced message traffic. Steps 6, 8 to 21, 22 and 23 have all been removed from the procedure of FIG. 2. Steps 1 to 10 of the procedure of FIG. 11 largely correspond to steps 1 to 11 of the procedure of FIG. 9, and so are not discussed in detail again. Steps 11 and 13 are newly added between the AMF/SEAF and AUSF in order to indicate the authentication result from the UE side.

If information exchange regarding EAP-Success or EAP-Failure between the UE and AUSF is not useful for a particular example or deployment, then steps 11 to 14 may be omitted.

Figure 12:
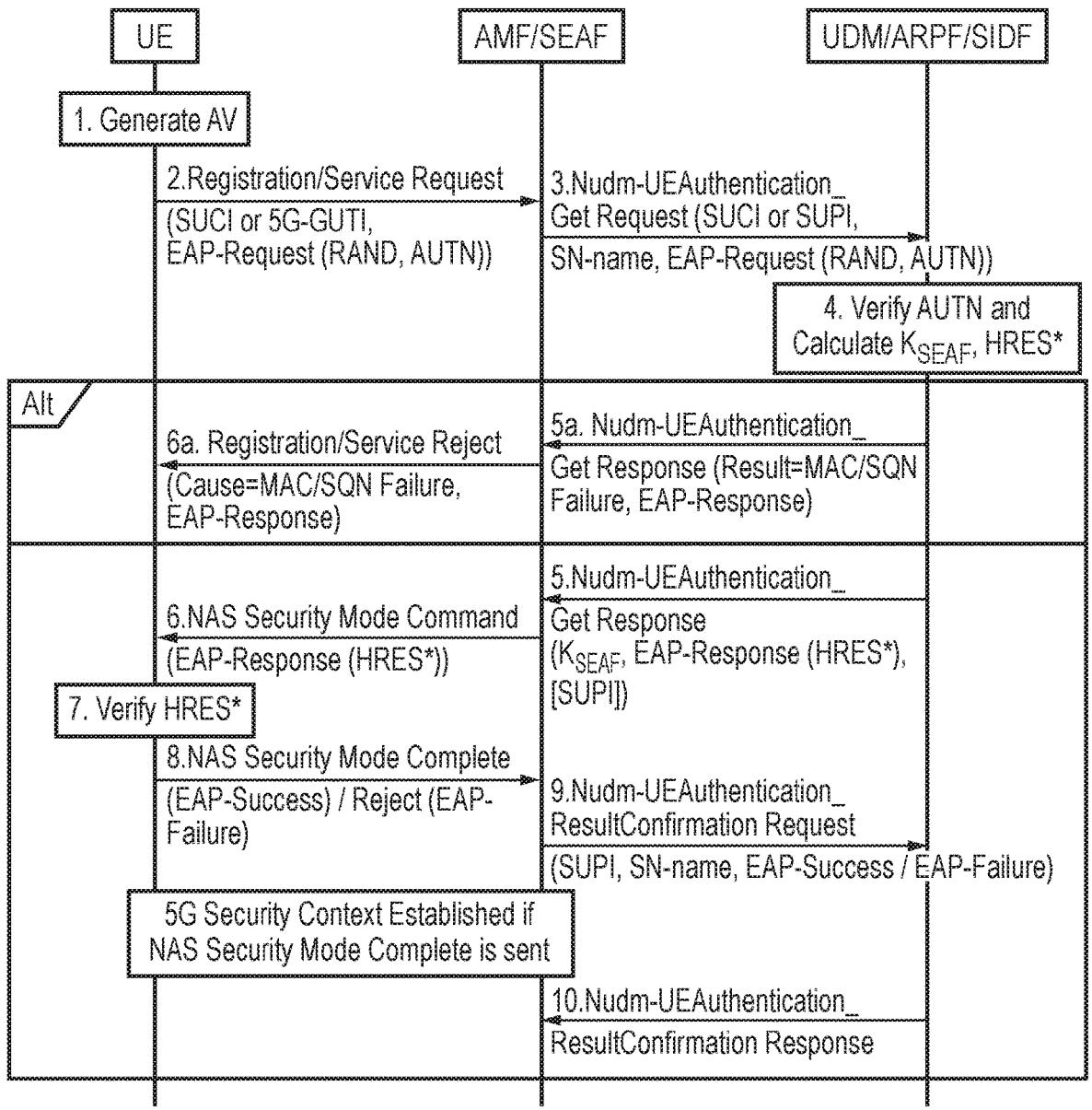
FIG. 12 is a flow diagram illustrating another implementation of methods according to the present disclosure in an EAP-AKA' procedure.

As for FIG. 9 above, if the UDM/ARPF is enhanced to handle EAP protocol messages as the AUSF handles them now, the network topology can be simplified by removing the AUSF node from the network. FIG. 12 illustrates a further simplified authentication procedure according to examples of the present disclosure, in which the AUSF has been removed. Comparing with the procedure in FIG. 11, it can be seen that at step 4, the UDM/ARPF calculates HRES* instead of RES*, as only HRES* can be used in serving network. Additionally, the UDM/ARPF derives and sends $K_{SEAF}$, as opposed to $K_{AUSF}$.

According to examples of the present disclosure, the USIM at UE side may support the following functions:
1. Generate RAND in the same way as it is now generated at the network;
2. Generate SQN in the same way as it is now generated at the network;
3. Verify the HRES* received from the network by comparing it with a locally calculated value.

According to examples of the present disclosure, the ARPF at the network side may support the following functions:
1. Validate a MAC received in AUTN from the UE as it is now validated at the USIM side;
2. Validate SQN received in AUTN from the UE;
3. Generate RES* (for AUSF) or HRES* (for AMF/SEAF) that is sent to the UE if both MAC and SQN pass the validation.

In order to ensure backwards compatibility with the existing legacy 5G AKA, methods according to the present disclosure may not overwrite the existing authentication procedure but rather co-exist with it in the same network. The network may broadcast the capability of authentication on the radio interface allowing a UE supporting the new authentication procedure to choose the new procedure on the basis that the network also supports it.

As discussed above, the methods 300 and 600 may be performed by a wireless device, and the present disclosure provides a wireless device that is adapted to perform any or all of the steps of the above discussed methods.

Figure 13:
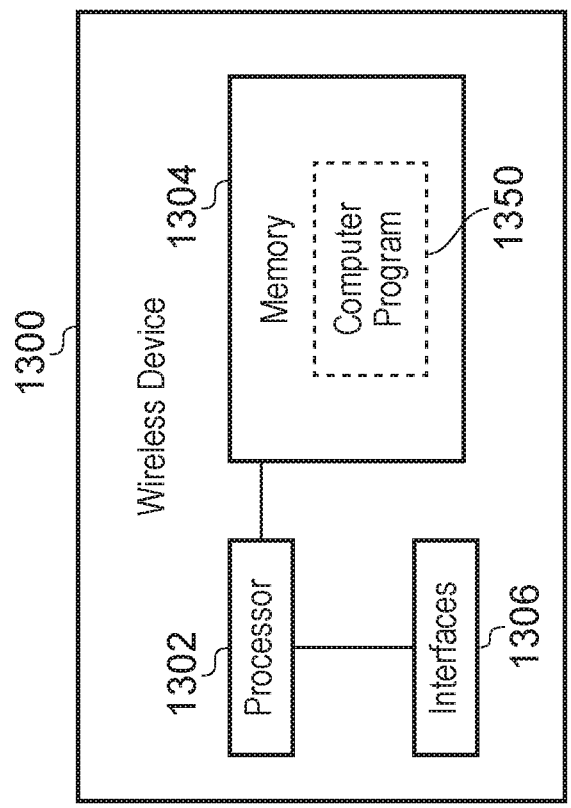
FIGS. 13 and 14 are block diagrams illustrating function modules in examples of wireless device.

FIG. 13 is a block diagram illustrating an example wireless device 1300 which may implement the method 300 and/or 600 according to examples of the present disclosure, for example on receipt of suitable instructions from a computer program 1350. Referring to FIG. 13, the wireless device 1300 comprises a processor or processing circuitry 1302, and may comprise a memory 1304 and interfaces 1306. The processing circuitry 1302 may be operable to perform some or all of the steps of the method 300 and/or 600 as discussed above with reference to FIGS. 3 and 6. The memory 1304 may contain instructions executable by the processing circuitry 1302 such that the wireless device 1300 is operable to perform some or all of the steps of the method 300 and/or 600. The instructions may also include instructions for executing one or more telecommunications and/or data communications protocols. The instructions may be stored in the form of the computer program 1350. In some examples, the processor or processing circuitry 1302 may include one or more microprocessors or microcontrollers, as well as other digital hardware, which may include digital signal processors (DSPs), special-purpose digital logic, etc. The processor or processing circuitry 1302 may be implemented by any type of integrated circuit, such as an Application Specific Integrated Circuit (ASIC), Field Programmable Gate Array (FPGA) etc. The memory 1304 may include one or several types of memory suitable for the processor, such as read-only memory (ROM), random-access memory, cache memory, flash memory devices, optical storage devices, solid state disk, hard disk drive etc.

Figure 14:
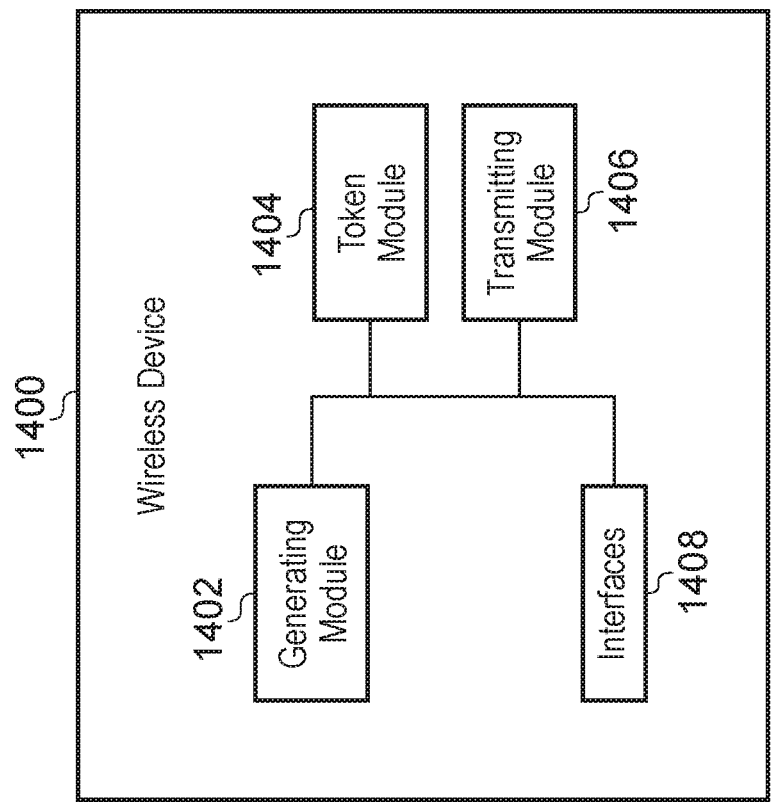

FIG. 14 illustrates functional units in another example of wireless device 1400 which may execute examples of the methods 300 and/or 600 of the present disclosure, for example according to computer readable instructions received from a computer program. It will be understood that the units illustrated in FIG. 14 are functional units, and may be realised in any appropriate combination of hardware and/or software. The units may comprise one or more processors and may be integrated to any degree.

Referring to FIG. 14, the wireless device 1400 comprises a generating module 1402 for generating a random value and for generating a sequence number. The wireless device 1400 further comprises a token module 1404 for assembling an authentication token from at least the generated sequence number, and a transmitting module 1406 for sending a message to an entity of the network requesting at least one of registration on the network or service over the network, the message including the generated random value and the authentication token. The wireless device 1400 may also comprise interfaces 1408.

Figure 15:
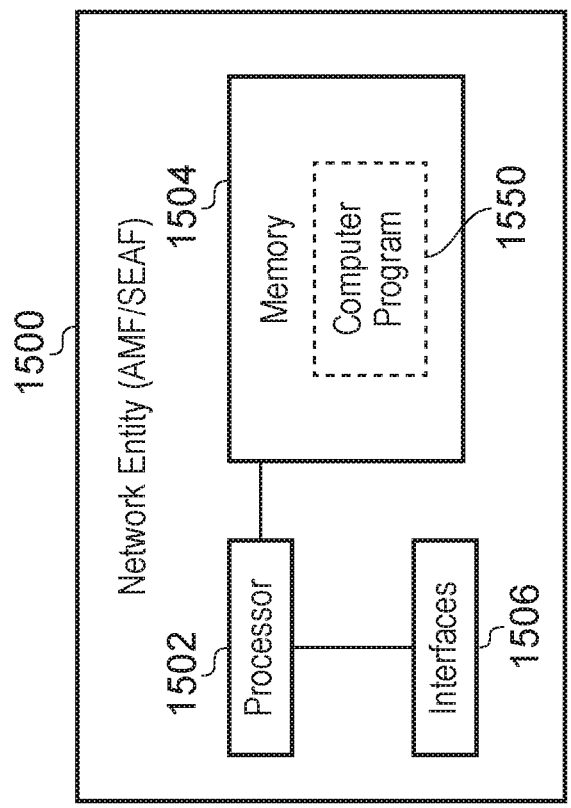
FIGS. 15 and 16 are block diagrams illustrating function modules in examples of network entity.

FIG. 15 is a block diagram illustrating an example network entity 1500 which may implement the method 400 and/or 700 according to examples of the present disclosure, for example on receipt of suitable instructions from a computer program 1550. The network entity may for example comprise an AMF/SEAF. Referring to FIG. 15, the network entity 1500 comprises a processor or processing circuitry 1502, and may comprise a memory 1504 and interfaces 1506. The processing circuitry 1502 may be operable to perform some or all of the steps of the method 400 and/or 700 as discussed above with reference to FIGS. 4 and 7. The memory 1504 may contain instructions executable by the processing circuitry 1502 such that the network entity 1500 is operable to perform some or all of the steps of the method 400 and/or 700. The instructions may also include instructions for executing one or more telecommunications and/or data communications protocols. The instructions may be stored in the form of the computer program 1550. In some examples, the processor or processing circuitry 1502 may include one or more microprocessors or microcontrollers, as well as other digital hardware, which may include digital signal processors (DSPs), special-purpose digital logic, etc. The processor or processing circuitry 1502 may be implemented by any type of integrated circuit, such as an Application Specific Integrated Circuit (ASIC), Field Programmable Gate Array (FPGA) etc. The memory 1504 may include one or several types of memory suitable for the processor, such as read-only memory (ROM), random-access memory, cache memory, flash memory devices, optical storage devices, solid state disk, hard disk drive etc.

Figure 16:
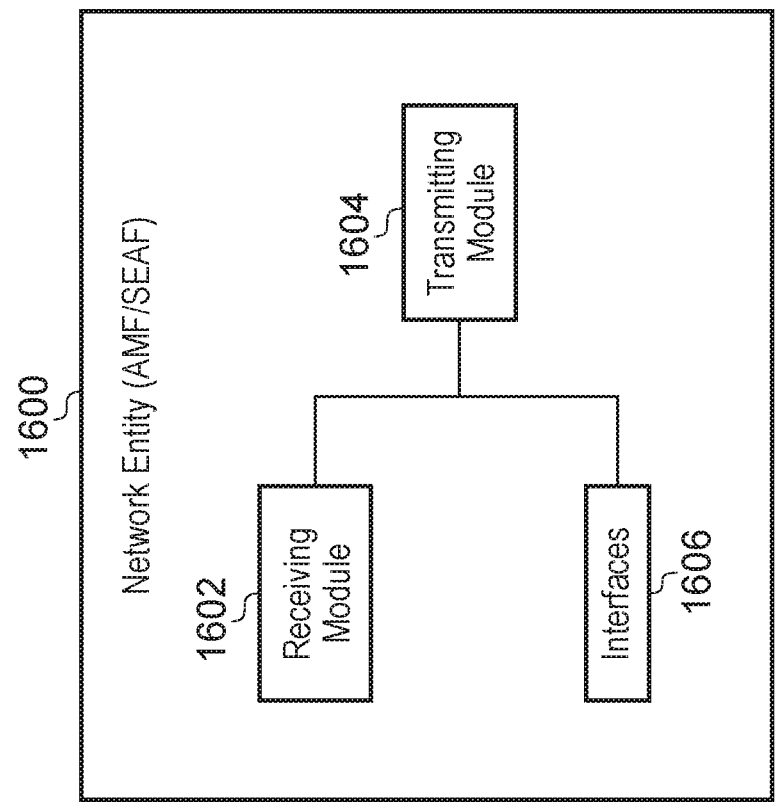

FIG. 16 illustrates functional units in another example of network entity 1600 which may execute examples of the methods 400 and/or 700 of the present disclosure, for example according to computer readable instructions received from a computer program. It will be understood that the units illustrated in FIG. 16 are functional units, and may be realised in any appropriate combination of hardware and/or software. The units may comprise one or more processors and may be integrated to any degree.

Referring to FIG. 16, the network entity 1600 comprises a receiving module 1602 for receiving a message from a wireless device requesting at least one of registration on the network or service over the network, the message including a random value and an authentication token assembled from at least a sequence number. The network entity 1600 further comprises a transmission module for sending a message to another network entity requesting authentication of the wireless device, the message including the random value and authentication token received in the message from the wireless device. The network entity 1600 may also comprise interfaces 1606. The network entity may for example comprise an AMF/SEAF.

Figure 17:
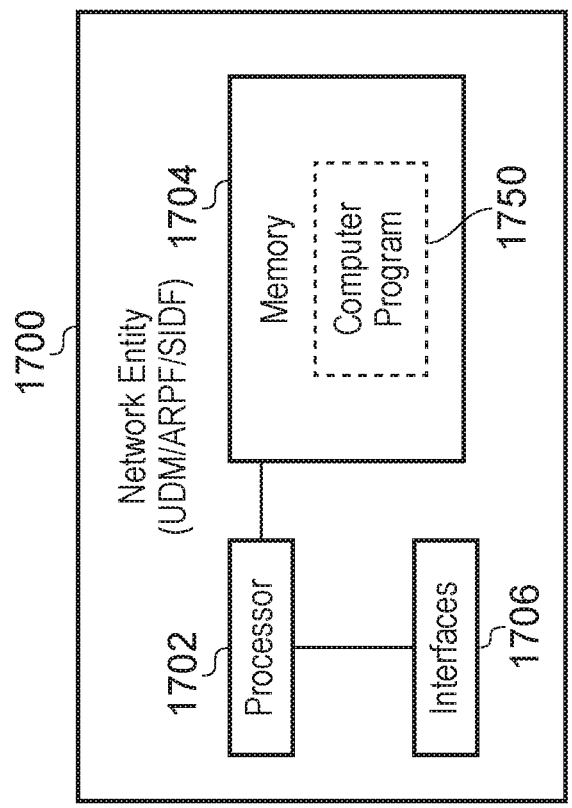

FIG. 17 is a block diagram illustrating an example network entity 1700 which may implement the method 500 and/or 800 according to examples of the present disclosure, for example on receipt of suitable instructions from a computer program 1750. The network entity may for example comprise a UDM/ARPF/SIDF. Referring to FIG. 17, the network entity 1700 comprises a processor or processing circuitry 1702, and may comprise a memory 1704 and interfaces 1706. The processing circuitry 1702 may be operable to perform some or all of the steps of the method 500 and/or 800 as discussed above with reference to FIGS. 5 and 8. The memory 1704 may contain instructions executable by the processing circuitry 1702 such that the network entity 1700 is operable to perform some or all of the steps of the method 500 and/or 800. The instructions may also include instructions for executing one or more telecommunications and/or data communications protocols. The instructions may be stored in the form of the computer program 1750. In some examples, the processor or processing circuitry 1702 may include one or more microprocessors or microcontrollers, as well as other digital hardware, which may include digital signal processors (DSPs), special-purpose digital logic, etc. The processor or processing circuitry 1702 may be implemented by any type of integrated circuit, such as an Application Specific Integrated Circuit (ASIC), Field Programmable Gate Array (FPGA) etc. The memory 1704 may include one or several types of memory suitable for the processor, such as read-only memory (ROM), random-access memory, cache memory, flash memory devices, optical storage devices, solid state disk, hard disk drive etc.

Figure 18:
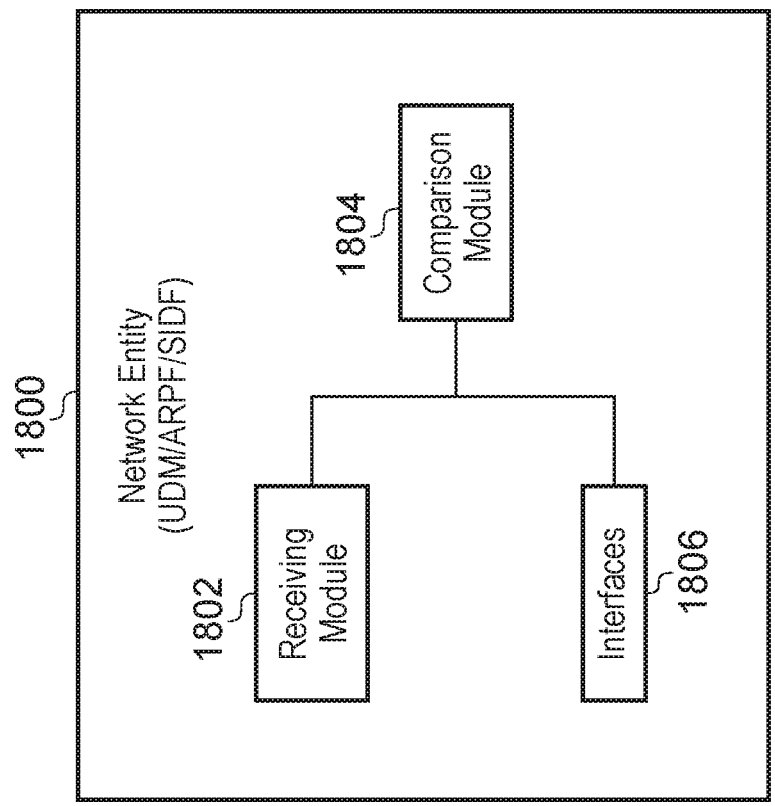
FIGS. 17 and 18 are block diagrams illustrating function modules in examples of another network entity.

FIG. 18 illustrates functional units in another example of network entity 1800 which may execute examples of the methods 500 and/or 800 of the present disclosure, for example according to computer readable instructions received from a computer program. It will be understood that the units illustrated in FIG. 18 are functional units, and may be realised in any appropriate combination of hardware and/or software. The units may comprise one or more processors and may be integrated to any degree.

Referring to FIG. 18, the network entity 1800 comprises a receiving module 1802 for receiving a message from another entity in the network, the message requesting authentication of a wireless device and including a random value and an authentication token assembled from at least a sequence number. The network entity further comprises a comparison module 1804 for comparing the sequence number to an authentication criterion. The network entity 1800 may also comprise interfaces 1806. The network entity may for example comprise a UDM/ARPF/SIDF.

Aspects of the present disclosure thus provide methods according to which Authentication and Key Agreement (AKA) procedures may be initiated by the wireless device, as opposed to the network. The initiation of authentication may be combined with initiation of other procedures, such as a registration or service request. Examples of the present disclosure are applicable for both 5G AKA and EAP-AKA' authentication as practiced in existing networks such as 3GPP LTE networks, 5G networks and future network evolutions after 5G.

Examples of the present disclosure ensure that a SQN re-synchronization procedure can be avoided completely, as well as reducing the lead time to establish NAS connection and a PDU session between a UE and a serving network. Following implementation of example methods according to the present disclosure, it will be possible to adapt a protocol stack of mobile communication using only one pair of message request and response, which message pair includes multiple layers of protocol data units exchanged between UE and network to establish the communication connection for both access stratum and non-access stratum.

As discussed above, the security of the 5G core network is improved by avoiding the exposure of $K_{AUSF}$ and RES* outside the UDM/ARPF before the UE is authenticated successfully. In addition, the AUSF node can be bypassed for 5G AKA or EAP-AKA' authentication or even removed in 5G network if there is no other use case.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The following abbreviations are used in the present disclosure and accompanying Figures:
5G AV 5G Authentication Vector
5G HE AV5G Home Environment Authentication Vector (consisting of RAND, AUTN, XRES*, and KAUSF)
5G SE AV 5G Serving Environment Authentication Vector (consisting of RAND, AUTN and HXRES*)
MAC Message Authentication Code included in AUTN
AUTN Authentication Token (SQN*AK∥AMF∥MAC)
AUTS Authentication Synchronization (SQN$_{MS}$*AK∥MAC-S)
CK Cipher Key
IK Integrity Key
NAS Non-Access-Stratum
RAND Random challenge
SQN Sequence number (consists of two concatenated parts SQN=SEQ∥IND)
UE User Equipment
USIM Universal Subscriber Identity Module.

The invention claimed is:

1. A method for operating a wireless device that is operable to connect to a network, the method, performed by the wireless device, comprising:
 initiating an authentication procedure toward the network by:
 generating a random value;
 generating a sequence number;
 assembling an authentication token from at least the generated sequence number;
 sending a message to an entity of the network requesting service over the network, the message including the generated random value and the authentication token;

receiving a message from the network entity, the message comprising an authentication parameter;

calculating an authentication parameter by:
  inputting at least the random value and key material shared with the wireless device to an authentication function, the key material comprising a long term secret key; and
  calculating a derivative of a result of the authentication function; and comparing the received authentication parameter with the calculated authentication parameter.

2. The method as claimed in claim 1, further comprising, if the received and calculated authentication parameters are the same:
  sending a message to the network entity indicating that authentication is successful.

3. The method as claimed in claim 1, further comprising, if the received and calculated authentication parameters are not the same:
  sending a message to the network entity indicating that authentication is not successful.

4. The method as claimed in claim 1, wherein assembling an authentication token from at least the generated sequence number comprises:
  calculating a Message Authentication Code on the basis of at least the generated sequence number and the generated random value; and
  concatenating at least the sequence number and the calculated Message Authentication Code to form the authentication token.

5. The method as claimed in claim 1, wherein generating a random value comprises generating the random value according to a process employed for generating a random value in at least one entity in the network.

6. The method as claimed in claim 1, wherein generating a sequence number comprises generating the sequence number according to a process employed for generating a sequence number in at least one entity in the network.

7. A wireless device that is operable to connect to a network, the wireless device comprising a processor and a memory, the memory containing instructions executable by the processor such that the wireless device is configured to:
  initiate an authentication procedure toward the network by:
  generating a random value;
  generating a sequence number;
  assembling an authentication token from at least the generated sequence number;
  sending a message to an entity of the network requesting service over the network, the message including the generated random value and the authentication token;
  receiving a message from the network entity, the message comprising an authentication parameter;
  calculating an authentication parameter by:
    inputting at least the random value and key material shared with the wireless device to an authentication function, the key material comprising a long term secret key; and
    calculating a derivative of a result of the authentication function; and
  comparing the received authentication parameter with the calculated authentication parameter.

\* \* \* \* \*